United States Patent
Tanaka et al.

(10) Patent No.: US 10,001,309 B2
(45) Date of Patent: Jun. 19, 2018

(54) AIR-CONDITIONING APPARATUS

(71) Applicants: Mitsubishi Electric Corporation, Tokyo (JP); Asahi Glass Company, Limited, Tokyo (JP)

(72) Inventors: Kosuke Tanaka, Tokyo (JP); Hiroaki Makino, Tokyo (JP)

(73) Assignees: Mitsubishi Electric Corporation, Tokyo (JP); Asahi Glass Company, Limited, Tokyo (JP)

( * ) Notice: Subject to any disclaimer, the term of this patent is extended or adjusted under 35 U.S.C. 154(b) by 115 days.

(21) Appl. No.: 15/125,607

(22) PCT Filed: Mar. 17, 2014

(86) PCT No.: PCT/JP2014/057032
§ 371 (c)(1),
(2) Date: Sep. 13, 2016

(87) PCT Pub. No.: WO2015/140874
PCT Pub. Date: Sep. 24, 2015

(65) Prior Publication Data
US 2017/0003060 A1 Jan. 5, 2017

(51) Int. Cl.
*F25B 49/02* (2006.01)
*F25B 45/00* (2006.01)
(Continued)

(52) U.S. Cl.
CPC .............. *F25B 49/02* (2013.01); *C09K 5/045* (2013.01); *F25B 13/00* (2013.01); *F25B 45/00* (2013.01);
(Continued)

(58) Field of Classification Search
CPC ...... F25B 45/00; F25B 49/02; F25B 2400/19; F25B 2500/19; F25B 2600/0253;
(Continued)

(56) References Cited

U.S. PATENT DOCUMENTS

| 5,892,135 A | 4/1999 | Manogue et al. |
| 2009/0041598 A1 | 2/2009 | Saito et al. |

(Continued)

FOREIGN PATENT DOCUMENTS

| CN | 1386184 A | 12/2002 |
| CN | 101375059 A | 2/2009 |

(Continued)

OTHER PUBLICATIONS

International Search Report of the International Searching Authority dated Jun. 10, 2014 for the corresponding International application No. PCT/JP2014/057032 (and English translation).

(Continued)

*Primary Examiner* — Marc Norman
(74) *Attorney, Agent, or Firm* — Posz Law Group, PLC

(57) ABSTRACT

An air-conditioning apparatus can suppress occurrence of disproportionation (an autolytic reaction) when HFO1123 refrigerant or a refrigerant mixture containing HFO1123 is applied. The air-conditioning apparatus includes a controller controlling at least one of an operation frequency of a compressor, an opening degree of an expansion valve, and an air amount of a fan sending air to a heat-source-side heat exchanger so that a temperature and a pressure of the refrigerant discharged from the compressor do not exceed threshold values.

2 Claims, 3 Drawing Sheets

(51) Int. Cl.
F25B 13/00 (2006.01)
C09K 5/04 (2006.01)
(52) U.S. Cl.
CPC .. *C09K 2205/126* (2013.01); *F25B 2400/121* (2013.01); *F25B 2400/19* (2013.01); *F25B 2500/19* (2013.01); *F25B 2600/021* (2013.01); *F25B 2600/0253* (2013.01); *F25B 2600/0271* (2013.01); *F25B 2600/111* (2013.01); *F25B 2600/2501* (2013.01); *F25B 2600/2513* (2013.01); *F25B 2600/2519* (2013.01); *F25B 2700/1931* (2013.01); *F25B 2700/1933* (2013.01); *F25B 2700/21152* (2013.01); *Y02P 20/124* (2015.11)
(58) Field of Classification Search
CPC ........ F25B 2600/0271; F25B 2600/111; F25B 2600/2501; F25B 2600/2513; F25B 2700/1931; F25B 2700/1933; F25B 2700/21152; C09K 5/045; C09K 2205/126
USPC .......................................................... 62/174
See application file for complete search history.

(56) References Cited

U.S. PATENT DOCUMENTS

| 2012/0272673 | A1 | 11/2012 | Yokohara et al. |
| 2014/0070132 | A1 | 3/2014 | Fukushima |
| 2014/0151015 | A1 | 6/2014 | Sun et al. |
| 2014/0157821 | A1* | 6/2014 | Schrader ................. F25B 49/02 62/509 |
| 2017/0010030 | A1* | 1/2017 | Tanaka ..................... F25B 13/00 |
| 2017/0082333 | A1* | 3/2017 | Shimazu ................... F25B 6/04 |
| 2017/0284714 | A1* | 10/2017 | Ishibashi ................. F25B 30/06 |

FOREIGN PATENT DOCUMENTS

| CN | 102725597 A | 10/2012 |
| CN | 103562338 A | 2/2014 |
| CN | 103717981 A | 4/2014 |
| EP | 1 300 637 A1 | 4/2003 |
| EP | 2 505 939 A1 | 10/2012 |
| JP | 2007-198230 A | 8/2007 |
| JP | 2009-138973 A | 6/2009 |
| JP | 2010-156524 A | 7/2010 |
| JP | 2012-132578 A | 7/2012 |
| JP | 5212537 B1 | 3/2013 |
| WO | 2009/157320 A1 | 12/2009 |
| WO | 2012/157764 A1 | 11/2012 |
| WO | 2013/016403 A1 | 1/2013 |

OTHER PUBLICATIONS

Extended European Search Report dated Oct. 27, 2017 for the corresponding European Patent Application No. 14 886 091.9.
Office Action dated Mar. 2, 2018 issued in corresponding CN patent application No. 201480077044.2 (and English translation).

* cited by examiner

AIR-CONDITIONING APPARATUS

CROSS REFERENCE TO RELATED APPLICATION

This application is a U.S. national stage application of PCT/JP2014/057032 filed on Mar. 17, 2014, the contents of which are incorporated herein by reference.

TECHNICAL FIELD

The present invention relates to an air-conditioning apparatus including a refrigerant circuit in which a compressor, a heat-source-side heat exchanger, an expansion valve, and a user-side heat exchanger are connected by a pipe, and refrigerant circulates.

BACKGROUND ART

Patent Literature 1 describes a heat cycle system using a heat cycle working medium containing 1,1,2-trifluoroe hylene (HFO1123).

CITATION LIST

Patent Literature

Patent Literature 1: WO2012/157764

SUMMARY OF INVENTION

Technical Problem

When HFO1123 refrigerant or a refrigerant mixture including HFO1123 refrigerant is applied as the refrigerant charged into a refrigerant circuit, as in the art described in Patent Literature 1, HFO1123 causes disproportionation (an autolytic reaction) under the conditions of high pressures and high temperatures, and an abrupt pressure increase or other troubles occurs due to serial reactions. Consequently, it is desired to perform an operation within a range of a proper pressure and temperature, so that disproportionation does not occur.

The present invention has been devised to solve the problem. An object of the present invention is to provide an air-conditioning apparatus that can suppress occurrence of disproportionation (an autolytic reaction) when HFO1123 refrigerant or a refrigerant mixture containing HFO1123 is applied.

Solution to Problem

An air-conditioning apparatus according to one embodiment of the present invention is an air-conditioning apparatus including a refrigerant circuit in which a compressor, a heat-source-side heat exchanger, an expansion valve, and a user-side heat exchanger are connected by a pipe, and a refrigerant circulates, the refrigerant being HFO1123 refrigerant or a refrigerant mixture containing HFO1123, and includes a controller controlling at least one of an operation frequency of the compressor, an opening degree of the expansion valve, and an air amount of a fan sending air to the heat-source-side heat exchanger so that a temperature and a pressure of the refrigerant discharged from the compressor do not exceed threshold values.

Advantageous Effects of Invention

One embodiment of the present invention can suppress occurrence of disproportionation (an autolytic reaction) when HFO1123 refrigerant or a refrigerant mixture containing HFO1123 is applied.

DESCRIPTION OF EMBODIMENTS

First Embodiment

Figure 1:
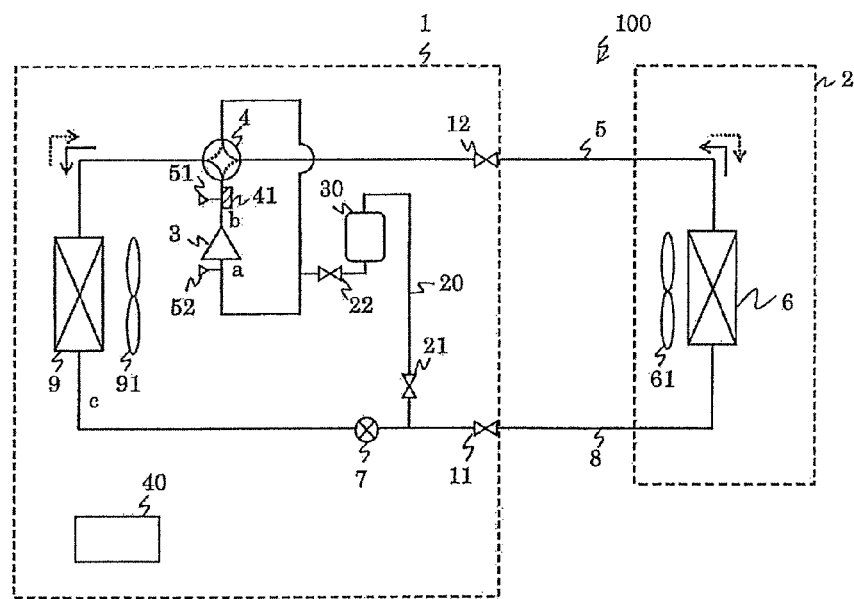
FIG. 1 is a refrigerant circuit diagram of an air-conditioning apparatus 100 according to a first embodiment.

FIG. 1 is a refrigerant circuit diagram of an air-conditioning apparatus 100 according to a first embodiment.

As illustrated in FIG. 1, the air-conditioning apparatus 100 includes an outdoor unit 1 and an indoor unit 2, and the outdoor unit 1 and the indoor unit 2 are connected by a liquid pipe 8 and a gas pipe 5.

The outdoor unit 1 includes a compressor 3, a four-way valve 4, a heat-source-side heat exchanger 9, an expansion valve 7, a heat-source-side fan 91 sending air to the heat-source-side heat exchanger 9, and a controller 40 controlling operations of respective components configuring the air-conditioning apparatus 100.

The indoor unit 2 includes a user-side heat exchanger 6, and a user-side fan 61 sending air to the user-side heat exchanger 6.

In the air-conditioning apparatus 100, the compressor 3, the four-way valve 4, the heat-source-side heat exchanger 9, the expansion valve 7 and the user-side heat exchanger 6 are sequentially connected by a pipe to form a refrigerant circuit in which refrigerant circulates.

The outdoor unit 1 further includes a bypass 20 branching the pipe between the expansion valve 7 and a first on-off valve 11 and connects the pipe to a pipe at a suction side of the compressor 3. The bypass 20 is provided with a first bypass on-off valve 21, a second bypass on-off valve 22, and a vessel 30 storing refrigerant.

The compressor 3 is of a type subjected to capacity control by having a rotation speed controlled by an inverter, for example.

The expansion valve 7 is an electronic expansion valve an opening degree of which is controlled to be variable, for example.

The heat-source-side heat exchanger 9 exchanges heat with outside air sent by the heat-source-side fan 91.

The user-side heat exchanger 6 exchanges heat with indoor air sent by the user-side fan 61.

The first bypass on-off valve 21 is provided at an inflow side of the refrigerant of the bypass 20 (at a pipe side between the expansion valve 7 and the first on-off valve 11).

The second bypass on-off valve 22 is provided at an outflow side (at a pipe side at the suction side of the compressor 3) of the refrigerant of the bypass 20.

The first bypass on-off valve 21 and the second bypass on-off valve 22 are on-off valves opening and closing a flow path for the refrigerant of the bypass 20.

The vessel 30 is a vessel storing refrigerant.

The gas pipe 5 and the liquid pipe 8 are connection pipes connecting the outdoor unit 1 and the indoor unit 2. The first on-off valve 11 and the second on-off valve 12 are respectively connected to the liquid pipe 8 and the gas pipe 5. The liquid pipe 8 connects the user-side heat exchanger 6 of the indoor unit 2 and the first on-off valve 11 of the outdoor unit 1. The gas pipe 5 connects the user-side heat exchanger 6 of the indoor unit 2 and the second on-off valve 12 of the outdoor unit 1.

The first on-off valve 11, the second on-off valve 12, the first bypass on-off valve 21 and the second bypass on-off valve 22 may be manual valves opened and closed manually, or may be electromagnetic valves with on-off states controlled by the controller 40.

The outdoor unit 1 further includes a discharge temperature sensor 41, a discharge pressure sensor 51, and a suction pressure sensor 52.

The discharge temperature sensor 41 detects a temperature of refrigerant discharged from the compressor 3.

The discharge pressure sensor 51 detects a pressure of the refrigerant discharged from the compressor 3.

The suction pressure sensor 52 detects a pressure of the refrigerant sucked into the compressor 3.

The pressure of the refrigerant circulating in the refrigerant circuit is the lowest at the suction side of the compressor 3, and is the highest at the discharge side of the compressor 3. Consequently, in the following explanation, the pressure at the suction side of the compressor 3 will be referred to as a low pressure, and the pressure at the discharge side of the compressor 3 will be referred to as a high pressure.

As the refrigerant for use in a refrigeration cycle (the refrigerant circuit) of the air-conditioning apparatus 100, a substance having properties causing disproportionation, such as 1,1,2-trifluoroethylene (HFO1123), or a refrigerant mixture in which other substances are mixed in the substance having the properties causing disproportionation is used.

As the substance that is mixed in the substance having the properties causing disproportionation to produce the refrigerant mixture, tetrafluoropropene (HFO1234 that is 2,3,3,3-tetrafluoropropene, HFO1234ze that is 1,3,3,3-tetrafluoro-1-propene, etc.), difluoromethane (HFC32), etc., are used, for example, but the substance is not limited to these substances, HC290 (propane), etc., may be mixed, any substance may be used, as long as it is the substance having heat performance that can be used as the refrigerant of a refrigeration cycle (the refrigerant circuit), and any mixing ratio may be adopted.

The air-conditioning apparatus 100 configured in this way is capable of performing a cooling operation or a heating operation by switch of the four-way valve 4. Further, the air-conditioning apparatus 100 is capable of performing a pump down operation of recovering the refrigerant in the indoor unit 2 into the outdoor unit 1.

Next, an operation action of the refrigeration cycle of the air-conditioning apparatus 100 will be described with reference to FIG. 1. In FIG. 1, solid lines show a flow at a time of cooling, and dotted lines show a flow at a time of heating.

(Cooling Operation)

First, the cooling operation in a normal operation will be described.

At a time of the cooling operation, the four-way valve 4 is switched to a cooling side (a state shown by the solid lines). Further, the first on-off valve 11, the second on-off valve 12 and the second bypass on-off valve 22 are in an open state. The first bypass on-off valve 21 is in a closed state.

When gas refrigerant at a high temperature and a high pressure is discharged from the compressor 3 in this state, the gas refrigerant at a high pressure and a high temperature flows into the heat-source-side heat exchanger 9 via the four-way valve 4, dissipates heat by heat exchange with outside air, and thereby becomes high-pressure liquid refrigerant to flow out. The high-pressure liquid refrigerant flowing out from the heat-source-side heat exchanger 9 flows into the expansion valve 7 to be low-pressure two-phase refrigerant.

The low-pressure two-phase refrigerant flowing out of the expansion valve 7 passes through the liquid pipe 8 to flow into the indoor unit 2, exchanges heat with room air in the user-side heat exchanger 6 to evaporate, and becomes low-pressure gas refrigerant to flow out. The low-pressure gas refrigerant flowing out of the user-side heat exchanger 6 passes through the gas pipe 5 to flow into the outdoor unit 1, and returns to the compressor 3 via the four-way valve 4.

At the time of the cooling operation, the first bypass on-off valve 21 is in a closed state, and thus the refrigerant does not flow into the bypass 20. Further, by the second bypass on-off valve 22 is brought into an open state, liquid seal of the vessel 30 can be prevented.

(Heating Operation)

Next, the heating operation in a normal operation will be described.

At the time of the heating operation, the four-way valve 4 is switched to a heating side (a state shown by the dotted lines). Further, the first on-off valve 11, the second on-off valve 12 and the second bypass on-off valve 22 are in an open state. The first bypass on-off valve 21 is in a closed state.

When gas refrigerant at a high pressure and a high temperature is discharged from the compressor 3 in this state, the gas refrigerant at a high pressure and a high temperature flows into the user-side heat exchanger 6 via the four-way valve 4 and the gas pipe 5, dissipates heat by heat exchange with room air, and thereby becomes high-pressure liquid refrigerant to flow out. The high-pressure liquid refrigerant flowing out from the user-side heat exchanger 6 passes through the liquid pipe 8 to flow into the expansion valve 7, and becomes low-pressure two-phase refrigerant.

The low-pressure two-phase refrigerant flowing out of the expansion valve 7 flows into the heat-source-side heat exchanger 9, and becomes low-pressure gas refrigerant by evaporating by heat exchange with outdoor air to flow out. The low-pressure gas refrigerant flowing out of the heat-source-side heat exchanger 9 returns to the compressor 3 via the four-way valve 4.

At the time of the heating operation, the first bypass on-off valve 21 is in a closed state, and thus the refrigerant does not flow into the bypass 20. Further, by bringing the second bypass on-off valve 22 into an open state, liquid seal of the vessel 30 can be prevented.

(Pump Down Operation)

Next, a pump down operation will be described.

At a time of the pump down operation, the four-way valve 4 is switched to the cooling side (the state shown by the solid lines). Further, the second on-off valve 12 and the first bypass on-off valve 21 are in an open state. The first on-off valve 11 and the second bypass on-off valve 22 are in a closed state. Further, the controller 40 makes the opening degree of the expansion valve 7 full open. Further, the controller 40 operates the heat-source-side fan 91 and the user-side fan 61.

When the compressor 3 is actuated in this state, gas refrigerant at low pressure is compressed by the compressor 3 to be refrigerant at a high temperature and a high pressure, and is discharged. The gas refrigerant at a high pressure and a high temperature discharged from the compressor 3 flows into the heat-source-side heat exchanger 9 via the four-way valve 4, dissipates heat by heat exchange with outside air, and thereby becomes high-pressure liquid refrigerant to flow out. The high-pressure liquid refrigerant flowing out from the heat-source-side heat exchanger 9 passes through the expansion valve 7, and flows into the bypass 20.

The high-pressure liquid refrigerant flowing into the bypass 20 passes through the first bypass on-off valve 21, and flows into the vessel 30. Since the second bypass on-off valve 22 is in a closed state, the high-pressure liquid refrigerant flowing into the bypass 20 is stored in the vessel 30.

The refrigerant in the user-side heat exchanger 6, the liquid pipe 8 and the gas pipe 5 is sucked by the operation of the compressor 3, and after the refrigerant is discharged from the compressor 3, the refrigerant is stored in the vessel 30 by the above described operation.

By the pump down operation like this, the refrigerant in the indoor unit 2 is recovered to the outdoor unit 1 side. After the pump down operation, the second on-off valve 12 is closed, and removal of the indoor unit 2, for example, is performed.

Next, a control operation of preventing occurrence of disproportionation will be described.

The air-conditioning apparatus 100 in the first embodiment uses HFO1123 refrigerant as a simple substance, or a refrigerant mixture in which HFO1123 and other refrigerants (for example, R32, HFO1234yf, etc.) are mixed, as the refrigerant for use in the refrigeration cycle (the refrigerant circuit).

In the HFO1123 refrigerant, disproportionation (an autolytic reaction) occurs under the conditions of high pressures and high temperatures, and abrupt pressure increase or other troubles occurs due to serial reactions.

That is, in order to prevent occurrence of disproportionation, it is necessary to operate the air-conditioning apparatus in such a manner that the temperature of the refrigerant is in a range of a proper pressure and temperature.

A chemical formula of disproportionation is as follows.

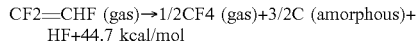

$$CF_2=CHF \text{ (gas)} \rightarrow 1/2 CF_4 \text{ (gas)} + 3/2 C \text{ (amorphous)} + HF + 44.7 \text{ kcal/mol}$$

Figure 2:
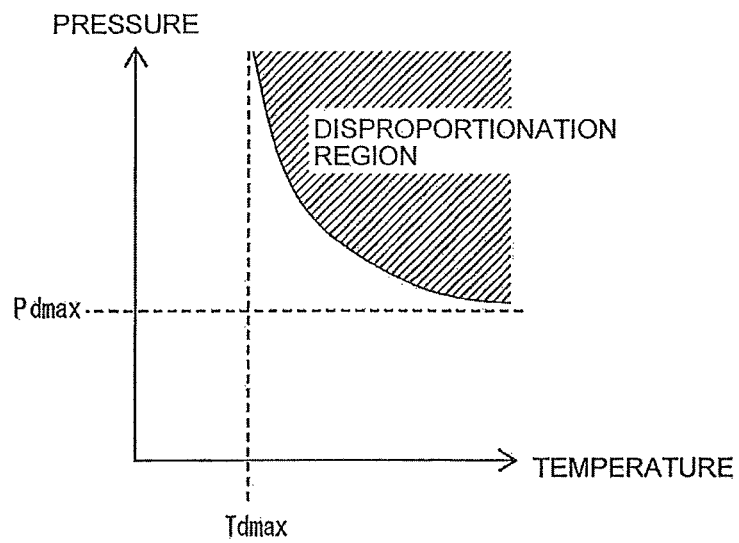
FIG. 2 is a diagram illustrating a relation of disproportionation of HFO1123 refrigerant, a pressure and a temperature.

FIG. 2 is a diagram illustrating a relation of disproportionation of HFO1123 refrigerant, the pressure and the temperature.

In the refrigerant circuit of the air-conditioning apparatus 100, it is the refrigerant discharged from the compressor 3 that has the highest temperature and pressure of the refrigerant. In particular, in the case of performing the pump down operation, an amount of the refrigerant circulating in the refrigerant circuit decreases, and therefore, there arises the situation where the temperature and the pressure of the refrigerant discharged from the compressor 3 are likely to increase.

Consequently, as illustrated in FIG. 2, control is performed so that the temperature of the refrigerant discharged from the compressor 3 does not exceed a temperature threshold value Tdmax, and the pressure of the refrigerant discharged from the compressor 3 does not exceed a pressure threshold value Pdmax, whereby the temperature and the pressure of the refrigerant are not in a disproportionation region, and occurrence of disproportionation can be prevented.

Figure 3:
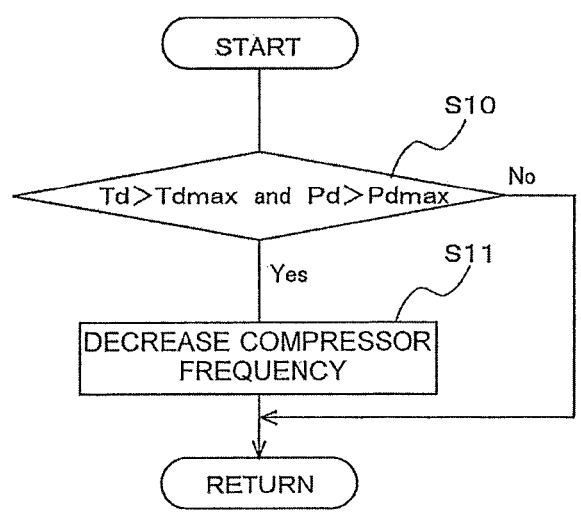
FIG. 3 is a flowchart illustrating an operation of a controller 40 of the air-conditioning apparatus 100 according to the first embodiment.

FIG. 3 is a flowchart illustrating an operation of the controller 40 of the air-conditioning apparatus 100 according to the first embodiment.

Hereinafter, the control operation of preventing occurrence of disproportionation will be described based on respective steps in FIG. 3.

(S10)

In the controller 40, information on the temperature threshold value Tdmax and the pressure threshold value Pdmax which are lower than the temperature and the pressure in the disproportionation region is stored in advance.

The controller 40 acquires detection results of the discharge temperature sensor 41 and the discharge pressure sensor 51, and determines whether or not the temperature (hereinafter, a discharge temperature Td) of the refrigerant discharged from the compressor 3 exceeds the temperature threshold value Tdmax, and whether or not the pressure (hereinafter, a discharge pressure Pd) of the refrigerant discharged from the compressor 3 exceeds the pressure threshold value Pdmax.

When the discharge temperature Td exceeds the temperature threshold value Tdmax, and the discharge pressure Pd exceeds the pressure threshold value Pdmax, the controller 40 proceeds to step S11.

When the discharge temperature Td does not exceed the temperature threshold value Tdmax, or the discharge pressure Pd does not exceed the pressure threshold value Pdmax, the operation in step 11 is not performed, and the controller 40 returns to step S10 while a present control state is kept.

(S11)

The controller 40 decreases (reduces) an operation frequency of the compressor 3. A decrease amount may be set in accordance with the discharge temperature Td and the discharge pressure Pd, or may be a value set in advance.

The controller 40 returns to step S10 after step S11, and repeats the above described operation. That is, the above described operations are repeated until the discharge temperature Td and the discharge pressure Pd become lower than the temperature threshold value Tdmax and the pressure threshold value Pdmax.

The control in step S11 is not limited to decrease of the operation frequency of the compressor 3, but may be increase of the opening degree of the expansion valve 7. Further, an air amount of the fan which sends air to the heat-source-side heat exchanger 9 may be increased. That is, the controller 40 can control at least one of the operation frequency of the compressor 3, the opening degree of the expansion valve 7 and the air amount of the fan sending air to the heat-source-side heat exchanger 9 so that the discharge temperature Td and the discharge pressure Pd do not exceed the temperature threshold value Tdmax and the pressure threshold value Pdmax.

A control operation of preventing occurrence of disproportionation described above may be performed in any case of the cooling operation time, the heating operation time, and the pump down operation time.

In the first embodiment as above, the controller 40 performs control so that the discharge temperature Td and the discharge pressure Pd do not exceed the temperature threshold value Tdmax and the pressure threshold value Pdmax.

Consequently, in the case of applying HFO1123 refrigerant or the refrigerant mixture containing HFO1123, occurrence of disproportionation (an autolytic reaction) can be suppressed.

Second Embodiment

In a second embodiment, a difference from the first embodiment will be mainly discussed, and explanation of the same components as in the first embodiment will be omitted by assigning the same reference signs to the same components.

In the above described first embodiment, the discharge temperature Td discharged from the compressor 3 is detected by using the discharge temperature sensor 41. However, a response delay is present in temperature detection by the discharge temperature sensor 41, and thus a difference may arise between the actual temperature and the detected temperature.

In the second embodiment, the discharge temperature Td is obtained by calculation from detection values of the discharge pressure sensor 51 and the suction pressure sensor 52.

Figure 4:
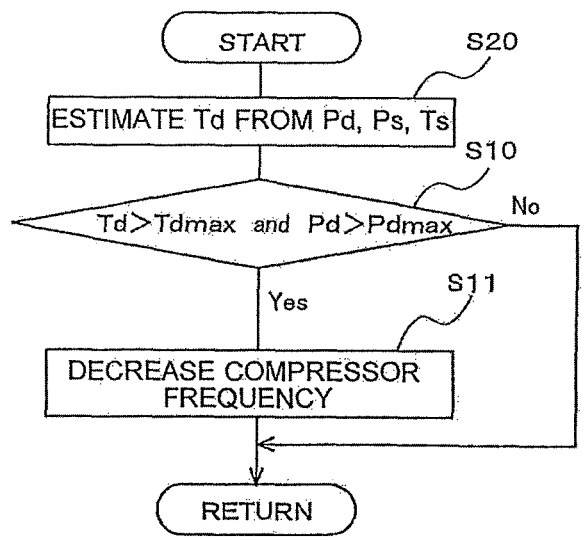
FIG. 4 is a flowchart illustrating an operation of the controller 40 of the air-conditioning apparatus 100 according to a second embodiment.

FIG. 4 is a flowchart illustrating an operation of the controller 40 of the air-conditioning apparatus 100 according to the second embodiment.

The difference from the above described first embodiment will be described below based on respective steps in FIG. 11. The same operations as in the above described first embodiment will be assigned with the same step numbers, and explanation of the same operations will be omitted.
(S20)

The controller 40 calculates the discharge temperature Td from the detection values of the discharge pressure sensor 51 and the suction pressure sensor 52.

When a compression process of the compressor 3 is considered as a polytrope change, the discharge temperature Td [K] satisfies a relation of expression (1) by using a temperature (hereinafter, a suction temperature Ts) [K] of the refrigerant sucked into the compressor 3, the discharge pressure Pd [MPa], a pressure (hereinafter, a suction pressure Ps) [MPa] of the refrigerant sucked into the compressor 3, and a polytrope index k [−].

[Mathematical expression 1]

$$Td = Ts \times \left(\frac{Pd}{Ps}\right)^{\frac{k-1}{k}} \quad (1)$$

For the discharge pressure Pd, the detection value of the discharge pressure sensor 51 is used.

For the suction pressure Ps, the detection value of the suction pressure sensor 52 is used.

The suction temperature Ts is obtained by calculation as a saturated gas temperature at the suction pressure Ps.

For the polytrope index k, a fixed value determined from characteristics of the compressor 3 is used.

The following operations are the same as in the above described first embodiment 1.

As above, in the second embodiment, the controller 40 calculates the discharge temperature Td from the detection values of the discharge pressure sensor 51 and the suction pressure sensor 52.

Consequently, the following effect is provided in addition to the effect of the above described first embodiment. That is, the discharge temperature Td is calculated by using the detection values of the discharge pressure sensor 51 and the suction pressure sensor 52 in which a response delay by heat capacity as in the temperature sensor does not occur, and therefore an error between the actual discharge temperature Td and the detection value can be decreased. Consequently, a temperature increase of the discharge temperature Td can be detected faster. Accordingly, occurrence of disproportionation (an autolytic reaction) can be suppressed more precisely.

REFERENCE SIGNS LIST 1 outdoor unit 2 indoor unit 3 compressor 4 four-way valve 5 gas pipe 6 user-side heat exchanger 7 expansion valve 8 liquid pipe 9 heat-source-side heat exchanger 11 first on-off valve 12 second on-off valve 20 bypass 21 first bypass on-off valve 22 second bypass on-off valve 30 vessel 40 controller 41 discharge temperature sensor 51 discharge pressure sensor 52 suction pressure sensor 61 user-side fan 91 heat-source-side fan 100 air-conditioning apparatus

The invention claimed is:

1. An air-conditioning apparatus comprising:
 a refrigerant circuit in which a compressor, a heat-source-side heat exchanger, an expansion valve, and a user-side heat exchanger are sequentially connected, and refrigerant circulates therethrough, the refrigerant being HFO1123 refrigerant or a refrigerant mixture containing HFO1123; and
 a bypass branching from a pipe connecting the expansion valve and the user-side heat exchanger and connecting at a suction side of the compressor;
 a vessel provided to the bypass; and
 a controller configured to, at a time of a pump down operation in which the refrigerant discharged from the compressor is stored in the vessel via the bypass, control at least one of an operation frequency of the compressor, an opening degree of the expansion valve, and an air amount of a fan sending air to the heat-source-side heat exchanger so that a temperature and a pressure of the refrigerant discharged from the compressor do not exceed threshold values.

2. The air-conditioning apparatus of claim 1, further comprising:
 a discharge pressure sensor configured to detect the pressure of the refrigerant discharged from the compressor; and
 a suction pressure sensor configured to detect a pressure of the refrigerant sucked into the compressor,
 wherein the controller calculates the temperature of the refrigerant discharged from the compressor from detection values of the discharge pressure sensor and the suction pressure sensor.

* * * * *